2 Sheets--Sheet 1.

J. W. THORNBURG.
Fertilizer Spreaders.

No. 137,736.      Patented April 8, 1873.

Witnesses.      Inventor.

J. W. THORNBURG.
Fertilizer Spreaders.
No. 137,736.    Patented April 8, 1873.
Fig. 3.
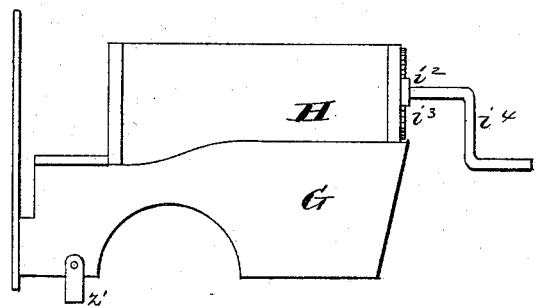
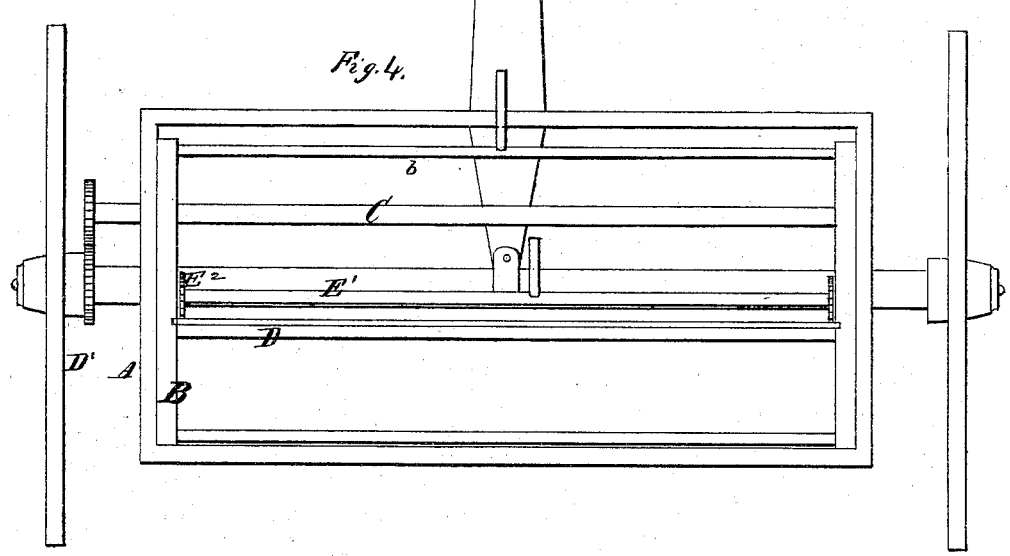
Fig. 4.
Witnesses.
C. B. Steele
Phil. C. Masi.
Inventor.
John W. Thornburg
Chipman Hosmer & Co
Attorneys

UNITED STATES PATENT OFFICE.

JOHN W. THORNBURG, OF WOODSTOCK, VIRGINIA, ASSIGNOR OF ONE-HALF HIS RIGHT TO LEONIDAS H. McGINNIS, OF SAME PLACE.

IMPROVEMENT IN FERTILIZER-SPREADERS.

Specification forming part of Letters Patent No. 137,736, dated April 8, 1873; application filed November 9, 1872.

*To all whom it may concern:*

Be it known that I, JOHN W. THORNBURG, of Woodstock, in the county of Shenandoah and State of Virginia, have invented a new and valuable Improvement in Fertilizer-Spreader; and I do hereby declare that the following is a full, clear, and exact description of the construction and operation of the same, reference being had to the annexed drawing making a part of this specification, and to the letters and figures of reference marked thereon.

Figure 1:
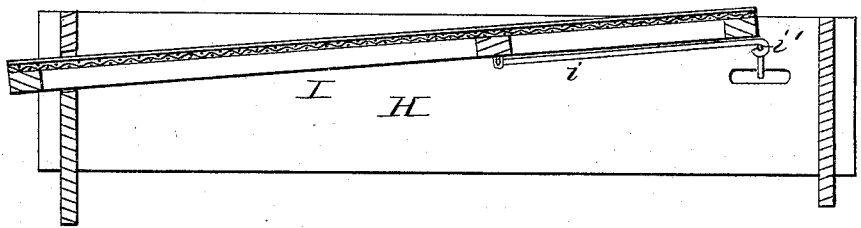
Figure 2:
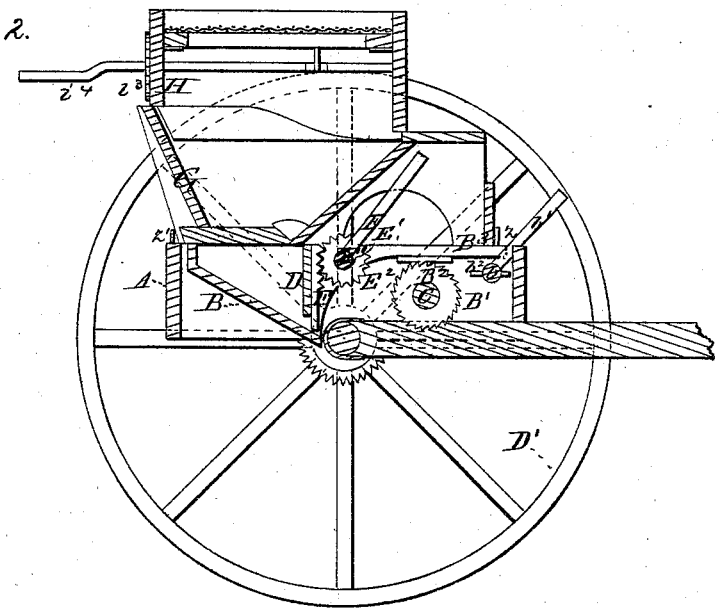

Figure 1 of the drawing is a representation of a vertical longitudinal section of removable screen attached to my fertilizer-distributer. Fig. 2 is a transverse vertical section of my fertilizer-distributer. Fig. 3 is an end view of screen and hopper attached to my fertilizer-distributer. Fig. 4 is a top view of my fertilizer-distributer with hopper attached.

This invention has relation to fertilizer distributers and spreaders; and it consists in the construction and novel arrangement of the hopper, and the devices for regulating the discharge and spreading of the fertilizing material, all substantially as hereinafter more fully described.

In the drawing, A designates the main frame of the implement, between the sides of which is hinged the distributing-hopper B, which is agitated by means of ratchets $B^1$ acting on studs $B^2$ depending from the hopper-arms $B^3$. The ratchets are attached to a transverse shaft, C, which receives motion by means of gearings from the wheel $D^1$. Agitation is arrested by raising the arms $B^3$ by means of the revolving transverse bar $b$, having the handle $b^1$ and studs $B^2$. This agitation is designed to promote a uniform continuous distribution, and to prevent choking. A board, D, running across and closing down edgewise on the bottom of the hopper, regulates the discharge. This board is raised and lowered by a lever, E, attached firmly to a transverse rod, $E^1$, holding pinions $E^2$, which engage with racks F on the ends of the board.

The hopper should be lined with sheet zinc, to facilitate discharge and protect the wood from injury by lime or other caustic substances.

The lower edge of the feed-board should be protected by a narrow strip of sheet iron, projecting below the wood, and adapted for contact with the inclined zinc bottom of the hopper, when desired to shut off all discharge.

G designates a removable hopper, resting on the frame A, and used for conducting the fertilizer to the discharge-hopper. This upper hopper should be also lined with zinc.

What I claim as my invention, and desire to secure by Letters Patent, is—

1. In a fertilizer-distributer the vibrating discharge-hopper B, having the arms $B^3$, studs $B^2$, ratchets $B^1$, and studded shaft $b$, arranged to impart a vertical motion to said hopper, substantially as and for the purpose set forth.

2. The combination of the removable hopper G, and vibrating discharge-hopper B, substantially as specified.

3. The slide or feed board D, racks F, and pinions $E^2$, combined and arranged with the hopper B, substantially as described.

In testimony that I claim the above I have hereunto subscribed my name in the presence of two witnesses.

JOHN WILLIAM THORNBURG.

Witnesses:
L. H. McGINNIS,
J. L. CAMPBELL.